May 7, 1940.  A. V. ROMBERGER  2,199,963
FOOT PEDAL ASSEMBLY
Filed Jan. 23, 1939

INVENTOR.
Arthur V. Romberger
BY
ATTORNEY.

Patented May 7, 1940

2,199,963

UNITED STATES PATENT OFFICE 2,199,963

FOOT PEDAL ASSEMBLY

Arthur V. Romberger, South Pasadena, Calif.

Application January 23, 1939, Serial No. 252,324

5 Claims. (Cl. 74—560)

My invention relates particularly to foot pedals for actuating various mechanisms where a plurality of pedal members are to be used in the control of machinery, such, for example, as in the actuation of accelerator, clutch and brake mechanisms of a motor vehicle.

The principal object of my invention is to provide a pedal assembly which brings together a plurality of pedal members and associates them in such proximity to each other and in such form and relationship to each other, that they have the appearance of a single, or unitary pedal structure with sectional portions to be independently moved by the foot with the minimum of lateral movement of the foot on the pedal structure.

Another object of my invention is to provide a pedal structure in which the sections rest in the same plane, and in which a middle section is connected for operation of brake mechanisms, with sections at either side for operating or actuating, respectively, an accelerator or throttle, and a clutch mechanism, and so arranged that the brake operating pedal section can be actuated by either foot or by both feet, if desired, as by a woman or weak person.

Another object of my invention is to provide in such a sectional pedal structure having the pedal sections lying in the same plane and contiguous to each other, roller elements to facilitate the movement of the foot laterally from one to the other across the division line between said pedal sections, said roller elements also serving to position the foot and to sense the misplacement of the foot relative to the pedal sections without looking.

Other objects and advantages of my invention will appear from the following description of one practical embodiment thereof, taken with the accompanying sheet of drawings on which the same is illustrated, and in which—

Figure 1:
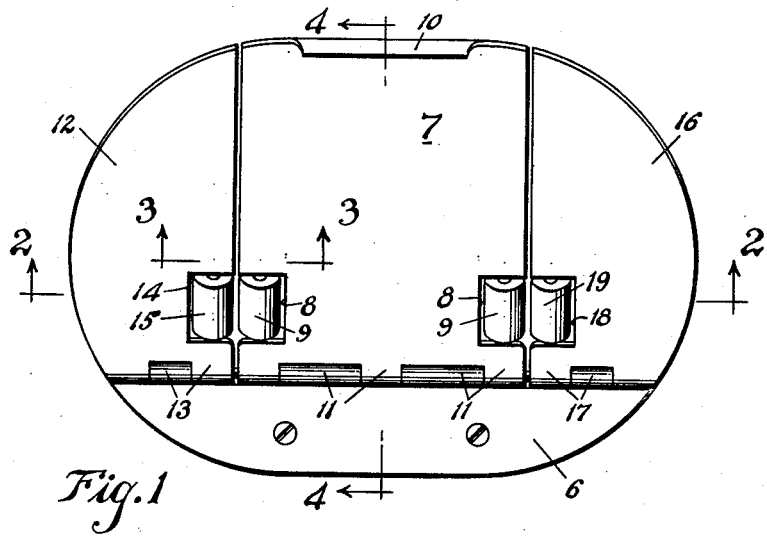
Figure 1 is a plan view of a foot pedal assembly embodying my invention.
Figure 2:
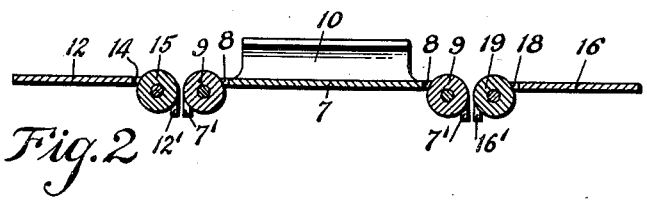
Figure 2 is a horizontal sectional view taken on the line 2—2, of Fig. 1.
Figure 3:
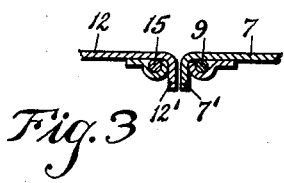
Figure 3 is a fragmentary sectional view taken on the line 3—3 of Fig. 1.

Referring now in detail to the drawing, on which I have illustrated one practical embodiment of my invention, 5 designates the foot board in front of the driver of an automobile, also indicating the inclined portion 5' thereof.

An anchor or hinge plate or member 6, is shown secured to the floor or foot board 5. In some cars this hinge plate might be on the inclined portion of the floor, as the construction may require or permit.

Hingedly secured to said member 6, is a pedal section 7, shown to be of rectangular form, having its opposite edges turned downwardly, as at 7', 7', and provided with a cut-out 8, to provide room for mounting a roller 9, at each side thereof, said rollers 9, 9, extending slightly above the plane of the pedal section, as clearly indicated. The upper end of said pedal section is shown turned over to form a guard 10, to prevent the foot from accidentally slipping upwardly too far. Said pedal section is hinged with two hinges, as 11, 11, at its lower end, to the member 6.

At the left side of said pedal section 7, is a second pedal section 12, hinged to the member 6, as at 13, and having a cut-out 14, to receive a roller element 15, adjacent the roller element 9, and having its side, next to the middle pedal section 7, turned down, as at 12', similar to the section 7.

At the right side of said pedal section 7, is a third pedal section 16, hinged to the member 6, as at 17, and having a cut-out 18, to receive a roller element 19, and having its side, next to the middle pedal section 7, turned down, as at 16', similar to the section 7, as clearly shown.

Thus I have provided a pedal structure having three pedal sections 7, 12 and 16, so formed and mounted that they form in appearance and assembly a single or unitary pedal structure in three sections, with all three sections lying in the same plane, and forming an oval shaped assembly, as clearly illustrated. The adjacent edges of the three sections are turned down slightly to form smooth side edges, and also to give increased strength to the pedal sections, making it possible to use lighter sheet metal for the pedal sections.

Figure 4:
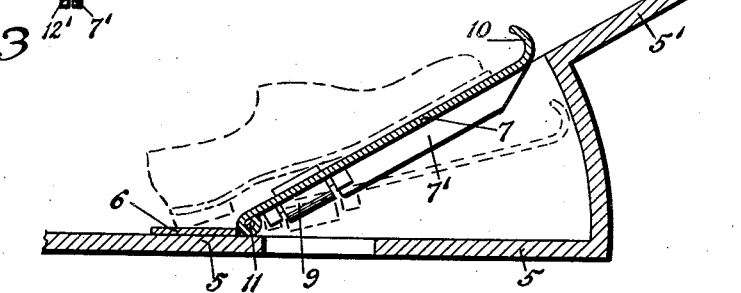
Figure 4 is a sectional view taken on line 4—4 of Fig. 1.

By referring to Fig. 4, in which the position of the foot is indicated in light broken lines, it will be seen that the foot rests upon the pedal section in such manner that the roller element 9 would be positioned in the arch of the foot when the foot is in its proper relative position over the pedal structure and that it is an easy thing to move the foot laterally in either direction, across the division between the middle section 7 and either of the side sections 12 or 16.

I do not limit my invention to the particular construction and arrangement here shown for descriptive purposes, knowing that slight changes can be made in the structure without departing from the spirit of the invention, nor do I limit the invention to the use described in the illustration, but intend that a pedal structure in two or more sections, in the same plane, adapted to be independently operated by one foot by moving the foot laterally from one to the other, is within the spirit of my invention.

I do not, therefore, limit my invention except as I may be limited by the hereto appended claims.

I claim:

1. A pedal structure for operating the brake, the accelerator and clutch of an automobile and including a pedal structure with three sections contiguous to each other, in the same plane, and hingedly anchored at their lower ends, and roller elements near the juncture of said sections for lateral movement of the human foot thereon from one section to the other.

2. A pedal structure in three sections lying in the same plane and contiguous to each other to be independently depressed, said sections being hingedly connected to a common axis whereby the free ends can be actuated by one foot moved laterally from one section to the other, and anti-friction means in the upper surface to facilitate the lateral movement of the foot thereon from one section to the other.

3. A pedal structure of the character shown and described and consisting of three pedal sections lying in the same plane and contiguous to each other edge to edge, hinge means connecting said sections to a common member secured to the floor board of an automobile, said middle section having its upper end provided with a guard to prevent accidental slipping of foot upwardly, and roller elements adjacent the juncture between said sections to facilitate the lateral movement of a foot from one section to the other.

4. In a pedal structure, a plurality of pedal sections made of flat material and held edge to edge in the same plane, so the human foot can move laterally back and forth from one section to another across the juncture between said sections for independent operation thereof, said sections being hingedly mounted at their lower ends and said sections together forming a uniform unit contour with anti-friction means in their surfaces to facilitate the movement of the foot laterally over the faces of said pedal sections.

5. A pedal structure of oval contour, formed in three sections edge to edge in the same plane, and hingedly connected at their lower ends with a common member with their axes in alinement, said sections having their edges turned down to stiffen said sections, and anti-friction means to facilitate the movement of the foot laterally over the face of said pedal sections.

ARTHUR V. ROMBERGER.